United States Patent [19]

Eichweber

[11] Patent Number: 4,801,201

[45] Date of Patent: Jan. 31, 1989

[54] METHOD AND DEVICE FOR LASER-OPTICAL MEASUREMENT OF COOPERATIVE OBJECTS, MORE ESPECIALLY FOR THE SIMULATION OF FIRING

[75] Inventor: Kurt Eichweber, Hamburg, Fed. Rep. of Germany

[73] Assignee: Precitronic Gesellschaft fur Feinmechanik und Electronic mbH, Hamburg, Fed. Rep. of Germany

[21] Appl. No.: 812,791

[22] Filed: Dec. 23, 1985

[30] Foreign Application Priority Data

Dec. 31, 1984 [DE] Fed. Rep. of Germany ....... 3447887
Oct. 7, 1985 [DE] Fed. Rep. of Germany ....... 3535744

[51] Int. Cl.$^4$ ................................................ G01C 3/08
[52] U.S. Cl. ............................................ 356/4; 356/5
[58] Field of Search ................................... 356/4, 5

[56] References Cited

U.S. PATENT DOCUMENTS

| 4,355,904 | 10/1982 | Balasubramanian | 356/4 |
| 4,384,199 | 5/1983 | Ogino et al. | 356/4 |
| 4,527,893 | 7/1985 | Taylor | 356/4 |

*Primary Examiner*—Stephen C. Buczinski
*Assistant Examiner*—Linda J. Wallace
*Attorney, Agent, or Firm*—Handal & Morofsky

[57] ABSTRACT

A method for the laser-optical measurement of cooperative objects at an uncertain distance by emission of a laser beam and evaluation of the echo reflected at the object, more especially for simulation of firing for practice purposes. In order to be able to adapt the size of the beam cross-section to the target conditions within limited distance ranges, within a coherent measurement process a plurality of similar individual measurements are undertaken with differing beam divergences, which are associated in each instance with differing distance ranges. If echos which come from a distance substantially greater than the distance associated with the set divergence are received, then these are excluded from the evaluation.

11 Claims, 1 Drawing Sheet

METHOD AND DEVICE FOR LASER-OPTICAL MEASUREMENT OF COOPERATIVE OBJECTS, MORE ESPECIALLY FOR THE SIMULATION OF FIRING

DESCRIPTION

The invention relates to a method and a device for the laser-optical measurement of cooperative objects at an uncertain distance, more especially for the simulation of firing for practice purposes, in which a laser beam is emitted and its echo reflected at the object is received and evaluated.

In known arrangements for shooting practice, there are provided on the weapon a laser emitter and receiver, with which the target cooperates by means of a retroreflector, which sends back the laser beam in its direction of origin. The determination of whether the simulated firing would have struck the target is undertaken in the form of a measurement process in which the direction from which the echo arrives is compared with the direction in which the simulated hit is disposed; in this connection, the last-mentioned direction is represented, for example, by the optical axis of the system. The measurement process can be based on a scanning movement of the laser beam; in this case, the direction in which the target is situated, as seen by the marksman (target line) may be determined as that direction in which the beam is emitted at that instant within its scanning movement at which an echo reflected by the target is received. The prerequisite for this is a laser beam of limited divergence and having a cross-sectional magnitude in the region of the target which is np greater than appears to be expedient for the simulation of firing. However, at a given divergence, the beam cross-section increases with increasing distance. Accordingly, at a typical divergence of one mrad, the lobe formed by the laser beam has a width of 0.2 m at a distance of 200 m and a width of 3 m at a distance of 3 km. This leads to the paradoxical result that with known firing simulators in most cases better hit rates are achieved at a greater target distance than at close range. It would be possible to contemplate the idea that in order to avoid this error the beam divergence should be set in each instance in relation to the measurement distance in such a manner that the laser beam lobe possesses a predetermined width in the target region. However, in the case of firing simulation and in the case of the measurement of rapidly moving objects, such as aircraft during landing control, there is not sufficient time available for such a setting.

The measurement of the object can also be based on the principle that the target field is illuminated by a stationary laser beam of relatively large divergence and that the direction from which the echo reflected by the target comes is determined at the device. This has the advantage that the laser beam scanning movement, which is costly in terms of engineering and which is time-consuming in the measurement process, can be dispensed with. In order even at close range to be able to guarantee a width of the illuminated field of for example 4×4 m, the beam must on the other hand possess a divergence which is so great that, on account of the energy density of more distant targets which decreases quadratically with distance, no echo signals capable of evaluation can be received any longer. Furthermore, the energy density cannot be increased without further ado, because at small distances it must not exceed the threshold for damage to the eyes.

Accordingly, the object of the invention is to provide a method and a device of the initially mentioned kind, which lead to results which are more faithful to reality and which also permit the application of the last-explained measurement principle for objects at differing distances, more especially for the simulation of firing.

The solution according to the invention consists in that the divergence of the beam is set in such a manner that the beam exhibits a predetermined size of cross-section at the object.

In this connection, the beam is to be understood as referring in general to the laser beam as such. In consequence of its being set to a predetermined size of cross-section, its energy density at the object (apart from the losses caused by the atmosphere) is invariably the same, so that reliable signals are also obtained from the most widely varying distances.

Even though the measurement result of the simulation of firing is dependent upon the cross-sectional dimensions of the beam, it is evident from the setting of the beam cross-section that the assessment is independent of the distance. For example, if for the hit/miss distinction it is merely determined whether a narrow laser beam simulating firing strikes or does not strike a detector or retroreflector at the object, the setting of the divergence according to the invention, of the beam ensures that the result of this determination is valid at any distance, while in the case of conventionally non-adjustable beam divergence an excessively low hit rate is measured at a small object distance in consequence of the beam cross-section which is then small, and an excessively large hit rate is measured at a large distance in consequence of the beam cross-section which is then large. If a beam passing through a scanning pattern is employed in this connection, then the term "beam" can be understood as referring to the entire scanning beam system; in these circumstances, the scanning angle which is run through takes the place of the divergence, so that the size of the scanning pattern at the target invariably has a pre-determined size. The divergence of the laser beam forming the scanning system can likewise be appropriately adjustable.

Advantageously, within a coherent measurement process a plurality of similar measurements are undertaken with different beam divergences, which are associated with different distances so as to correspond to a predetermined beam cross-section. In this connection, those echos which come from a substantially greater distance are expediently eliminated from the evaluation. A device for carrying out this method possesses, in the beam path of the laser beam emitter, an objective of variable focal length together with a drive for rapid adjustment during the measurement.

If very rapidly adjustable arrangements for varying the focal length are available, a discontinuous operation enters into consideration, in which each measurement process is composed of a plurality of measurement steps, during which the divergence is fixedly set in each instance and with which specific distances are in each instance associated. However, in general a continuous adjustment is to be preferred, during which a sequence of individual measurement or a continuously coherent measurement takes place. On account of the high speed of laser range finding and its electronic evaluation, a multiplicity of individual measurements may be carried out without further ado within a measurement process lasting for a period of time below the human reaction threshold of 0.1 sec, for example for a distance of 4 km a total of 20 measurements, in each instance for mutually adjacent partial distances of equal length or of equal divergence difference. It is also possible within a measurement process in the first instance to carry out a distance measurement and subsequently to set the divergence to the measured distance for a second measurement step; in this case, the angular measurement is merely based on the results of the second measurement step.

It forms part of the teaching of the invention that only those echos which originate from a greater distance than the respectively appropriate distance must be excluded from the evaluation, while the echos originating from a smaller distance can be separated out but do not need to be separated out.

This becomes comprehensible when consideration is given to the fact that only those echos which originate from an imaginary corridor, proceeding from the measurement device, of constant cross-section, are to be evaluated. If the laser measurement beam is adjusted in such a manner that it completely fills this corridor at the distance of the object to be measured, then at any smaller distance it has a cross-section which is smaller than that of the corridor. Consequently, each echo which comes in from a smaller distance also originates from a place located within the corridor and is consequently desired. Beyond the set distance, the laser beam cross-section does however exceed the corridor cross-section, so that it is not certain from echos coming in from a greater distance whether they originate from a location situated inside or outside the corridor. Accordingly, only the echos originating from a greater distance must be excluded from the evaluation.

According to the invention, in many cases it is not necessary to provide a particular arrangement which excludes the echos originating from a greater distance, if it is ensured that the sensitivity of the receiving arrangement is set in such a manner that echos coming in from a greater distance are below the response threshold. This concerns both those receivers which are disposed at the measuring device (firing simulator) and also those on the object side, which can be provided there for the reception of specific information. This setting is easy, because the energy density of the echo decreases superproportionally with the distance. In order to be able to utilize this phenomenon on an optimal basis, it can be expedient that the sensitivity of the reciever or the intensity of the laser beam is adjustable. However, this is also not absolutely necessary. If the response threshold of the receiver transmits echos from smaller or greater distances, depending upon the respective transparency of the atmosphere, the only result of this is that the width of the prescribed corridor from which the echos can be received is correspondingly larger or smaller. This can be taken into consideration in the evaluation of the results.

If it is desired to be independent of the atmospheric conditions, then according to the invention it is possible to measure the echo transmission time and to exclude from the evaluation those echos with an echo transmission time substantially greater than that echo transmission time which corresponds to the distance associated with the respective divergence. For this purpose, the evaluation arrangement can include a range finder, an arrangement for the generation of a signal reproducing the respectively determined distance value, an arrangement for the emission of a signal reproducing the distance limiting value corresponding to the respective setting of the objective, and an arrangement for the comparison of the distance signal with the distance limiting value signal. If the comparison shows that the echo under examination originates from a distance which is beyond the distance limiting value, then it is excluded from the further evaluation. If the device is designed in such a manner that for differing distance ranges in each instance separate measurement steps are carried out, then a particular distance limiting value can be stored in the evaluation arrangement for each one of these distance ranges. To do this, it is sufficient to establish a series of staggered distance limiting values, which are associated in each instance with a divergence setting. In place of this, it is also possible to determine the limiting value in each instance at a specific percentage rate above the respective distance range. This is in particular advantageous in circumstances in which no separate measurement steps take place for different distance ranges, but the multiplicity of measurements merge with one another into a continuous measurement process during continuous setting of divergence.

The invention will be described in greater detail hereinbelow with reference to the drawing. In the drawing.

Figure 3:
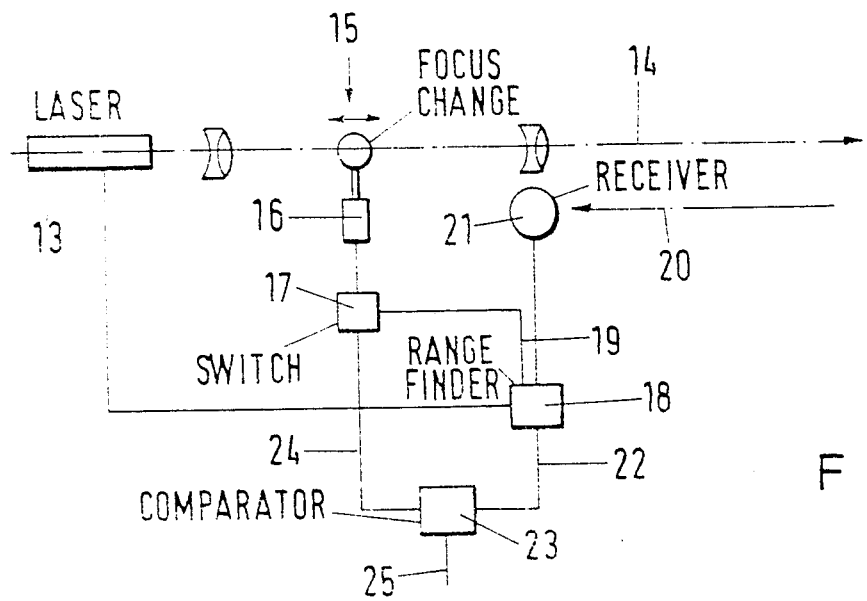

FIG. 3 shows the block circuit diagram of a device. P According to FIG. 1, it is assumed that from the firing simulator 1 there proceeds a laser beam, which is bounded by the lines 2. Target objects 3 to 7 are represented as black rectangles. They are equipped with a triple reflector, which serves as a retroreflector and which is represented by a white central spot. The target objects 3 and 5 are disposed on the optical axis with their retroreflector within the beam cross-section. The target object 7 which is set up at a large distance with a certain lateral displacement is also situated within the beam cross-section, while the target object 4, which exhibits an equal lateral displacement and which is situated in closer proximity to the firing simulator, is situated outside the beam cross-section 2. This illustrates the apparently greater hit rate at greater distance in the case of known devices with invariable beam divergence; in this connection, it should be added as a further disadvantage that the range of the beam remains limited, because its cross-sectional dimension oriented to a distance range between for example 500 and 1,500 m results, at greater distances, in an energy output which is no longer adequate.

Figure 1:
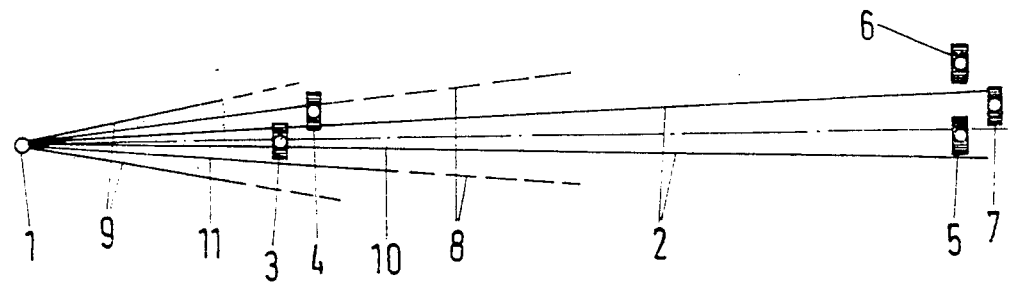
FIG. 1 shows schematically a beam/object arrangement

According to the invention, in the same measurement process not only the beam 2 but also further beams with other divergences are used, of which in FIG. 1 those with boundaries 8 and 9 are indicated, which, having a greater beam width, are associated with smaller distance ranges. They also cover the target object 4.

Target object 6 is situated so far from the central axis that it is not to be detected by the beam; more precisely stated, it is not to be relied upon for the purposes of a measurement evaluation. Although, as can be seen in FIG. 1, it is situated within the cross-section region of the beams 8 and 9, this is achieved as a result of the fact that its energy density on reaching this object has fallen off so greatly as a result of its large divergence that the reflected signal is below the response threshold of the receiver. As a result of this, for each one of these beams there is a limited range, which for the beam 8 if for example at the boundary 10 and for the beam 9 at the boundary 11. Thus it is achieved that echos capable of evaluation are received only from those objects which have a certain minimum closeness to the optical axis; in this connection, if the energy loss in the atmosphere is disregarded, this is approximately cOnStant Over the entire range of the device. The energy loss resulting from atmospheric influences has an effect such that the distance threshold, beyond which no echo signals capable of evaluation can be received any longer for a prescribed beam, is situated at a smaller beam cross-sectional area. As a result of this, at greater distances the objects must have a smaller distance from the optical axis in order still to be able to be detected.

The space from which according to the invention echo signals capable of evaluation can be obtained is accordingly not a lobe of the conventional type, which becomes thicker at a larger distance, but rather a corridor with a constant cross-section which becomes narrower at a large distance. This provides a greater approximation to real conditions.

Figure 2:
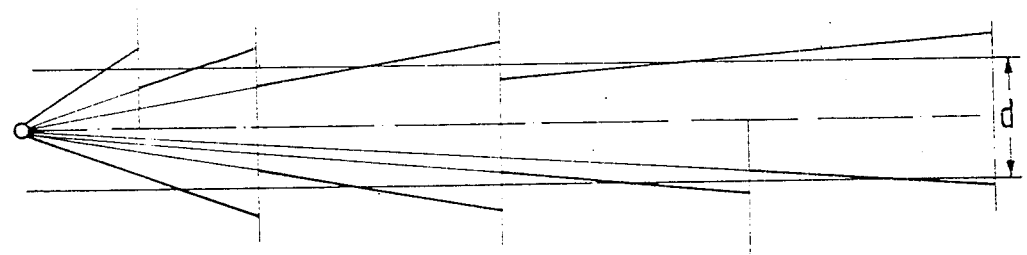
FIG. 2 shows examples of a beam arrangement.

FIG. 2 shows the manner in which the said corridor is composed of a multiplicity of individual beams. In the lower half of this Figure, it is provided that in each instance for equal distance ranges (for example from 200 to 200 meters) special measurement beams are provided, the ranges of action of which, as indicated by thick lines, are adjacent to one another. With this arrangement, at a greater distance there is a better approximation to the ideal corridor transverse dimension d than at a small distance. If, in place of this, it is desired to keep the falling below and exceeding of the ideal corridor dimension by the beam cross-section equal in all distance ranges, then what is arrived at is the arrangement indicated at the top in FIG. 2, in which the more distant distance ranges are greater than the close ones. With an equally good approximation to the cross-section values aimed at in the close region, with this arrangement a smaller number of individual measurements are sufficient. For example, 10 measurements over 4,000 m are sufficient if the distance limiting value of each individual measurement is 40% higher than that of the preceding one.

As has been stated, the determination of the distance limiting value associated with each individual measurement or individual beam, above which limiting value no further echos are to be processed, can be left to a situation in which appropriate values fall below the response sensitivity of the receiver, which sensitivity is possibly set in such a manner that the desired mean width d of the corridor detected is the result. If it is desired not to accept the uncertainties associated therewith, the solution according to FIG. 3 presents itself.

The laser 13 emits the laser beam 14, in the beam path of which a device 15 influencing the focal length of the objective is disposed. This is indicated as a glass sphere oscillating under the influence of the drive arrangement 16 in the direction of the optical axis in a regular manner at a frequency between preferably 10 and 100 Hz. In place of this, an axially moving, so-called Selfoc lens can for example also be used, or a rapidly movable zoom objective. The optical properties of the overall arrangement at any time of the period of oscillation are known; thus, the divergence of the generated laser beam 14 is also known at any instant. If during a measurement process lasting for one half-period of the oscillation of the sphere it is desired to carry out individual measurement at specific times, which are associated with specific beam divergences, then these times can be predetermined within the arrangement 17, which, in order to predetermine the periodic cycle, is connected with the drive arrangement 16. Thus, expressed in illustrative terms, the arrangement 17 takes over the function of a time-switch which runs synchronously with the oscillattion of the sphere 15 and which in each instance at specific times of the half-oscillation initiates an individual measurement by control of the range finder 18 by means of line 19.

The signal originating from the laser echo 20 is fed to the range finder 18 from the receiver 21 and is processed in a conventional manner. Via line 22, it feeds a signal representing the determined distance to the comparator 23. To the latter there is moreover fed via line 24 from the arrangement 17 a signal, which represents the distance limiting value corresponding to the respective individual measurement and to the pertinent laser beam divergence. The comparator 23 compares the signals fed to it via the lines 22 and 24, and thus compares the determined distance value with the distance limiting value associated with the measurement. If the distance value is below the distance limiting value, then a signal is transmitted via line 25 for further evaluation, while in the opposite case it is suppressed and thereby excluded from further evaluation.

The further evaluation can for example, consist in the generation of a hit signal, a distance indication or the like. The laser beam 14 can also be moved in a scanning manner; the further evaluation will then include a correlation between the signal and the respective beam direction as is known per se.

A detailed description of the arrangements 17, 18 and 23 is not required, because these are known to an electronics specialist having experience in the relevant field from the prior art.

The device 15 varying the focal length is expediently permitted to oscillate permanently, in order from time to time to extract individual oscillations for the performance of the measurement process. However, it is of course also possible to generate its movement in individual cases from time to time.

The condition of this device during each individual measurement can be regarded as quasi-stationary, because the path which it traverses during the short laser-optical range finding process is negligibly small.

What is claimed is:

1. In a method for the laser-optical measurement of cooperative objects at an uncertain distance of the type using emission of a laser beam and evaluation of the echo reflected by the object for target practice, the improvement comprising means for measuring the distance of the object and setting the divergence of the beam in accordance with the object distance in such a manner that the beam has a predetermined cross-sectional size at the object, said size being independent of the distance of said object whereby the relative size of an operative portion of the object with respect to the size of the beam at the object is maintained substantially constant so that the reflection of light by said operative portion and the detection of said reflected light give a uniform measure of accuracy.

2. In a method according to claim 1, the improvement wherein within a coherent measurement process, a plurality of similar measurements are undertaken at different beam divergences each associated with different distances, so as to obtain said predetermined beam cross-section at the object.

3. In a method according to claim 1, the improvement wherein reflected light which comes from a distance substantially greater than that distance corresponding to a given beam divergence are excluded from the evaluation.

4. In a method according to claim 3, the improvement wherein the echos with an energy density below a predetermined threshold are excluded from the evaluation.

5. In a method according to claim 3, the improvement wherein the echo transmission time is measured, and those echos with a transmission time substantially greater than that transmission time which corresponds to the distance associated with the respective divergence are excluded from the evaluation.

6. In a method according to claim 1, the improvement wherein all divergences provided for are run through in each measurement process.

7. In a device for the laser optical measurement of cooperative objects at an uncertain distance, for target practice, of the type comprising a laser beam emitter and systems for the reception and evaluation of the echo reflected by an object, the improvement comprising an objective of variable focal length together with a drive for rapid adjustment interposed in the output beam path of the laser beam emitter, means for measuring the distance of an object, and means for varying the divergence of an emitted laser beam in accordance with the distance of said object to obtain a uniform image cross section independent of object distance whereby the relative size of an operative portion of the object with respect to the size of the beam at the object is maintained substantially constant so that the reflection of light by said operative portion and the detection of said reflected light give a uniform measure of accuracy.

8. In a device according to claim 7, the improvement wherein a part of the objective generating the variation in focal length of the objective is drivable in periodic movement.

9. A device according to claim 7, characterized in that the evaluation arrangement includes a range finder (18) with an arrangement for the generation of a signal reproducing the respectively determined distance value, an arrangement (17) for the emission of a signal reproducing the distance limiting value corresponding to the respective setting of the objective, and an arrangement (23) for the comparison of the distance value signal with the distance limiting value signal.

10. A device according to claim 7, characterized in that the sensitivity of the receiver is adjustable.

11. A device according to claim 7, characterized in that it is designed to establish the direction of origin of the echo, and its limit of resolution is substantially below the beam divergence.

* * * * *